W. DUBILIER.
CONDENSER PLATE CONSTRUCTION.
APPLICATION FILED APR. 11, 1919.

1,334,142.

Patented Mar. 16, 1920.

William Dubilier INVENTOR

BY

Prindle, Wright & Small ATTORNEYS

UNITED STATES PATENT OFFICE.

WILLIAM DUBILIER, OF NEW YORK, N. Y.

CONDENSER-PLATE CONSTRUCTION.

1,334,142.  Specification of Letters Patent.  Patented Mar. 16, 1920.

Application filed April 11, 1919. Serial No. 289,264.

*To all whom it may concern:*

Be it known that I, WILLIAM DUBILIER, a citizen of the United States, residing at New York city, in the county of New York and State of New York, have invented a certain new and useful Condenser-Plate Construction, of which the following is a specification.

The invention has for an object to provide a condenser plate of such character that an intimate union may be effected between the plates and the intervening sheets of dielectric, or insulating material, and thus avoid the loss in capacity incurred in condensers in which small spaces exist between the conducting and insulating elements and the variations in capacity which result from the irregularity of such spaces within the elements of the same condensers, or of condensers of the same type.

Another object of the invention is to provide a condenser plate which will be so tough and durable that the edge of the same may be employed as a terminal of the condenser without danger of injury to the plate in the operation of shaping or connecting its terminal portions.

Further objects and advantages of the invention will be in part obvious and in part specifically mentioned in the description contained hereinafter, in which is disclosed one embodiment of the invention; such embodiment however, to be considered merely as illustrative of its principle.

In the drawings:—

Figure 1:
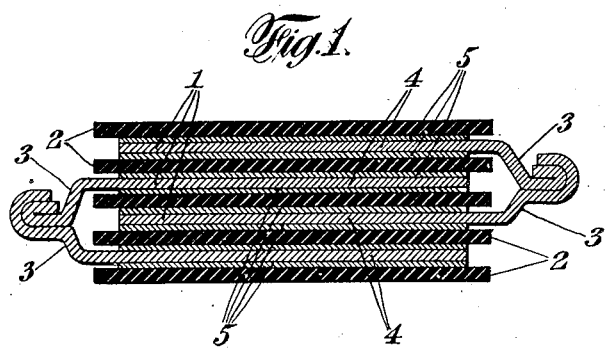
Figure 1 is a cross-sectional view of a portion of a condenser having conducting plates made according to the invention, the thickness of the plates being exaggerated for clearness.
Figure 2:
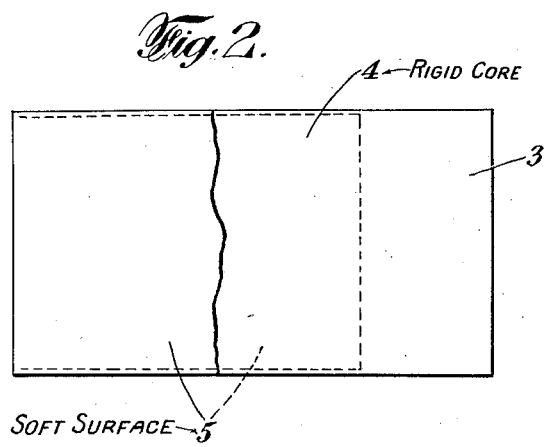
Fig. 2 is a plan view of one of such plates shown detached, with a portion thereof removed.

Referring to the drawings, the invention as illustrated is employed in a condenser of a common type, consisting of a plurality of conducting plates denoted generally by numeral 1, separated by insulating sheets 2, which may be of mica. In the present form, alternate conducting plates 1 are connected in parallel by assembling the plates and insulating sheets in such manner that edge portions 3 of alternate plates project beyond the same edge of the insulating sheets, so that such projecting edge portions 3 may be easily soldered or otherwise connected together. The invention however, in its broader aspect, is not limited to a condenser of any particular type.

In order to insure intimate contact and union between the surfaces of the conducting plates and the insulating sheets, such surfaces are made softer than the main body of the plate, and after the conducting plates and insulating sheets are assembled, an extremely high pressure is applied thereto, preferably many thousand pounds, or of such high values that the faces of the adjacent plates and insulating sheets are intimately united and brought into absolute union with each other. For instance, if mica be employed as a dielectric, its hairy and minutely irregular surface will be embedded into absolute union with the conducting plates, so as to eliminate any small voids or spaces between the same.

If the above mentioned voids or spaces are present in a condenser, the capacity is cut down owing to the larger distance between plates, and the capacity of different elements varies because of the irregularity of such spaces. Furthermore, the dielectric medium is non-uniform, since it consists at some points solely of mica, and at other points of mica and air, or impregnating compound, if the latter be employed. However, if a sufficient pressure be employed, and the surface of the plates be of such character as to conform readily to the surface of the insulating sheets, defects such as above described may be substantially overcome.

In the present form, this yielding or soft surface of the plates is obtained by employing a composite plate made up of a core or central portion 4, of relatively tough and rigid metal such as copper, upon the sides of which are placed strips 5 of soft yieldable metal such as foil. By using a high pressure upon the assembled elements of the condenser as above described, the foil surface of the conducting plates may be embedded into the surface of the insulating sheets, or into intimate contact and union with the same at all points, and by the same operation, the copper and foil surfaces are also brought into a similar contact or union with each other. The relatively stiff core of the plates however, brings about a construction in which the elements are not liable to undue changes in shape or warping in use.

When adjacent conducting plates are desired to be connected in parallel, as shown in Fig. 1, it is advantageous to employ sheets 5 of such dimensions that they do not extend beyond the insulating sheets 2, or are contained within the outline thereof, and to extend the central portion or core 4 of each plate beyond the edges of the insulating sheets so that the projecting edges 3 of each core may be electrically connected. If plates of this character are employed, the advantages of the soft surface of the foil are obtained, and yet the terminal portions of the condenser plates are all of tough and durable metal which will not readily tear or break in the operations of bending the terminals to the desired shape, or connecting them.

While a specific form of the invention has been described, it is obvious that many changes may be made without departing from the spirit of the invention as defined in the following claims.

I claim:—

1. A condenser comprising conducting plates separated by insulating sheets, surface layers of such plates being softer than the central portion thereof, and such surface layers being highly pressed substantially throughout into intimate contact and union with the insulating sheets.

2. A condenser comprising composite conducting plates separated by insulating sheets, said composite plates having a central layer of a relatively rigid material, and surface layers of a relatively soft material, such surface layers being highly pressed substantially throughout into intimate contact and union with the insulating sheets.

3. A condenser comprising composite conducting plates separated by mica sheets, said composite plates having a central layer of copper and surface layers of relatively softer metal foil, such surface layers being highly pressed substantially throughout into intimate contact and union with the insulating sheets.

4. A condenser comprising conducting plates separated by insulating sheets, surface layers of such plates being softer than the central portion thereof, and side edges of the central portion of alternate plates being extended beyond the intermediate insulating sheets and electrically connected together.

5. A condenser comprising conducting plates separated by insulating sheets, surface layers of such plates being softer than the central portion thereof, side edges of the central portion of alternate plates being extended beyond the intermediate insulating sheets and electrically connected together, and the softer surface layers of such plates being contained substantially within the outline of the insulating sheets.

6. A condenser comprising composite conducting plates separated by insulating sheets, said composite plates having a central portion of a relatively tough material and surface layers of relatively soft material, side edges of the central portion of alternate plates being extended beyond the intermediate insulating sheets and electrically connected together.

7. A condenser comprising composite conducting plates separated by insulating sheets, said composite plates having a central portion of a relatively tough material and surface portions of relatively soft material, side edges of the central portion of alternate plates being extended beyond the intermediate insulating sheets and electrically connected together, said surface portions being substantially contained within the outline of the insulating sheets.

8. A condenser comprising composite conducting plates separated by insulating sheets, said composite plates having a central core of copper and surface layers consisting of strips of relatively softer metal foil, side edges of the copper cores of alternate plates being extended beyond the insulating sheets and electrically connected together.

9. A condenser comprising composite conducting plates separated by insulating sheets, said composite plates having a central core of copper and surface portions consisting of strips of relatively softer metal foil, side edges of the copper cores of alternate plates being extended beyond the insulating sheets and electrically connected together, and the foil strips being contained substantially within the outline of the insulating sheets.

In testimony that I claim the foregoing, I have hereunto set my hand this 4th day of April, 1919.

WILLIAM DUBILIER.